FLYBACK TRANSFORMER AND TRANSISTORIZED DEFLECTION CIRCUIT

Filed Aug. 14, 1962

INVENTORS

BERNARD V. VONDERSCHMITT & ROBERT A. DANIEL

W. H. Spouagle

Attorney

United States Patent Office 3,143,686
Patented Aug. 4, 1964

3,143,686

FLYBACK TRANSFORMER AND TRANSISTORIZED DEFLECTION CIRCUIT

Bernard V. Vonderschmitt, New Hope, Pa., and Robert A. Daniel, Bellmawr, N.J., assignors to Radio Corporation of America, a corporation of Delaware Filed Aug. 14, 1962, Ser. No. 216,881
3 Claims. (Cl. 315—27)

This invention relates to flyback transformers and more particularly to flyback transformers for use in transistor television circuits.

In vacuum tube television receivers, utilizing electromagnetic deflection principles, it is customary to employ a flyback transformer in the horizontal deflection and high voltage power supply circuit thereof. The flyback transformer includes a primary coil which is directly connected in the anode-cathode circuit of the horizontal output tube and is coupled to deliver deflection current to the horizontal deflection windings of the deflection yoke. The transformer also includes a high voltage secondary coil which steps-up the flyback pulses produced during the retrace portion of the scanning cycle to supply the operating potential for the ultor electrode of the picture tube.

During the retrace portion of the scanning cycle, a relatively high inverse voltage is produced across the horizontal output tube. While a vacuum tube is a high voltage device and can withstand the high inverse voltage produced, a serious problem is presented when a transistor is substituted therefor. A transistor is a low voltage device and will break down under similar peak voltages. Consequently the peak voltage developed in the primary coil of the flyback transformer in a transistor television receiver must be kept below the breakdown voltage of the output transistor. However, since identical picture tubes are utilized in both vacuum tube and transistor television receivers, the low voltage of the primary coil of the flyback transformer in a transistor receiver must still be stepped-up in the secondary coil of the transformer to a magnitude equivalent to a vaccum tube receiver, to provide the proper ultor electrode operating potential.

When a very large number of turns is provided in the secondary coil to step-up the relatively low voltage in the primary coil in a transistor circuit, it is found that undesired oscillations or "ringing" occurs during the trace portion of the scanning cycle. This is due to the excessively high stray capacitance exhibited by the large secondary coil. Such parasitic oscillations are undesirable not only because they produce a light intensity modulation in the picture tube raster but also because power is wasted in the deflection circuit. On the other hand, if the number of turns in the primary coil of the flyback transformer is reduced so as to permit the desired step-up transformation with a smaller secondary coil, the low inductance exhibited by the primary coil shunts the deflection current and deprives the horizontal deflection windings in the yoke in parallel therewith of the proper operating current.

While external circuit components could be added to transistor circuits, as was done heretofore in some vacuum tube circuits, to counteract the effects of "ringing," by either cancelling or dissipating the undesired oscillations, the "ringing" would still be permitted to start. Such a solution is not desirable since it not only adds to the cost of the television receiver but also detracts from the performance of the horizontal deflection circuit.

Accordingly, it is an object of this invention to provide an improved flyback transformer for transistor television circuits.

It is another object of this invention to provide an improved flyback transformer for a transistorized, pulse type, high voltage power supply circuit wherein undesired oscillations are not permitted to start.

It is a further object of this invention to provide an improved flyback transformer for a transistor horizontal deflection circuit which provides the proper deflection current as well as the proper ultor electrode voltage for the picture tube of television receiver without the generation of spurious oscillations in the circuit.

The invention relates to a flyback transformer for a transistor television circuit and includes a bi-part, apertured ferrite core having a portion which is constricted as compared to the remaining portion of the core. A high voltage secondary coil is wound, in the configuration of a disc, around the constricted portion of the core thereby enabling a reduction in the area of the secondary coil. A low voltage primary coil is wound around a part of the said remaining portion of the core.

Such a constriction in the core of the flyback transformer permits a sufficient reduction in the area of the high voltage secondary coil so that the distributed stray capacitance between the secondary coil and circuit ground is significantly reduced. This reduction in stray capacitance permits a transistor horizontal deflection circuit to be designed in the manner disclosed in the Murakami and Vonderschmitt Patent 2,964,674, "Television Receiving Systems," issued December 13, 1960, to prevent undesired oscillations or "ringing" from starting in the deflection circuit. Additionally, the relatively small portion of the core which is constricted does not substantially increase the total reluctance of the bi-part ferrite core. Consequently, the inductance exhibited by the primary coil of the flyback transformer is not significantly reduced and the horizontal deflection windings are not deprived of the proper deflection current.

The novel features that are considered to be characteristic of this invention are set forth with particularity in the appended claims. The invention itself, however, both as to its organization and method of operation, as well as additional objects and advantages thereof, will best be understood from the following description when read in conjunction with the accompanying drawings, in which:

Figures 1, 2:
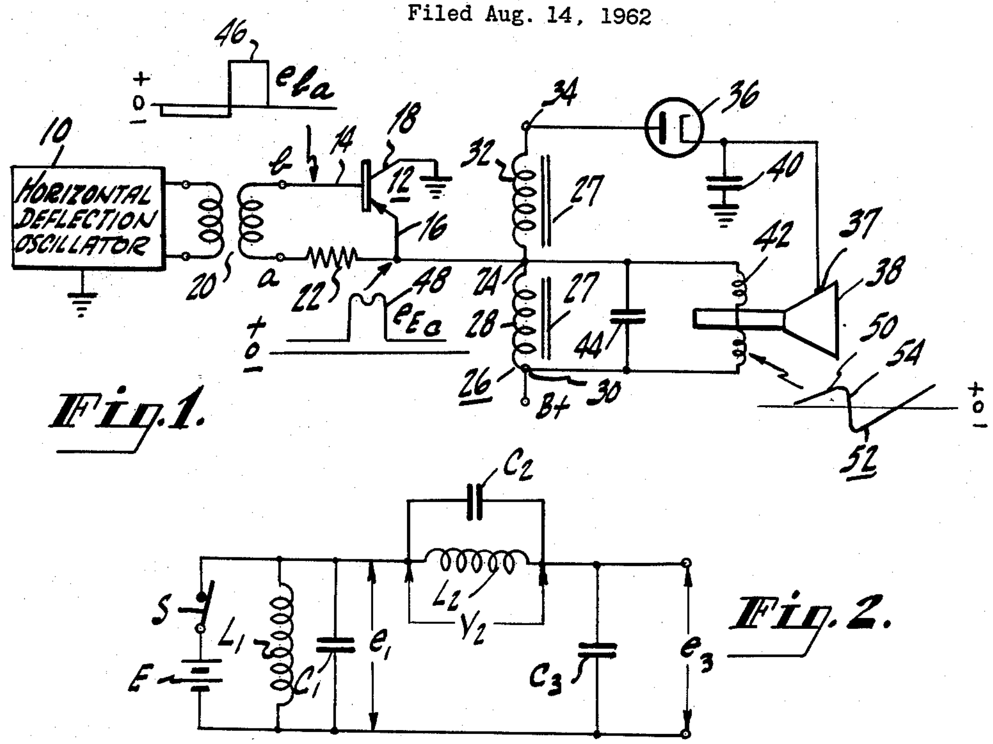
FIGURE 1 is a schematic circuit diagram of a portion of a television receiver including a transistor horizontal deflection circuit containing a flyback transformer embodying the invention.
FIGURE 2 is an equivalent circuit diagram of the circuit of FIGURE 1 illustrating the leakage reactances which introduce undesired oscillations into the circuit.

Referring now to the drawings and particularly to FIGURE 1, a high voltage power supply and horizontal deflection circuit includes a suitably synchronized horizontal deflection oscillator 10 which is coupled to a horizontal output transistor 12. The output transistor 12 includes base 14, emitter 16 and collector 18 electrodes. Horizontal deflection waves from the oscillator 10 are applied to the output transistor 12 through a transformer 20, the secondary of which is coupled between the base 14 and emitter 16 electrodes of the transistor 12 through a resistor 22. The collector electrode 18 of the transistor 12 is grounded while the emitter electrode 16 thereof is coupled to a terminal 24 of a horizontal output flyback transformer 26 embodying the invention and including a magnetic core 27 of a configuration to be described subsequently. The flyback transformer 26, which is shown connected as an autotransformer, includes a low voltage primary winding 28 defined by the terminals 24 and 30 and a high voltage secondary winding 32, defined by the terminals 24 and 34. The terminal 30 of the transformer 26 is connected to a source of B+ potential to supply energizing current to the circuit.

The high voltage terminal 34 of the secondary winding 32 of the transformer 26 is coupled to the anode of a high voltage rectifying diode 36, while the cathode of the diode 36 is connected to the ultor electrode terminal 37 of a picture tube 38. A filter capacitor 40 is also connected between the cathode of the diode 36 and ground to smooth the rectified ultor electrode voltage. A pair of horizontal deflection windings 42 for the picture tube 38 are connected directly across the terminals 24 and 30 of the low voltage primary winding 28 of the transformer 26. A capacitor 44 is shunted across the horizontal deflection windings 42 to select the proper retrace time for the electron beam in the picture tube 38.

Driving signals 46, having a wave shape, substantially as shown in FIGURE 1, are applied to the output transistor 12. The negative portion of the drive signal 46 is selected to have a magnitude sufficient to drive the transistor 12 into saturation. The transistor 12, when saturated, exhibits a very low impedance, and effectively functions as a closed switch. Therefore, the voltage drop thereacross is negligible, as shown by the initial portion of the emitter voltage curve 48. Thus, substantially the entire B+ voltage appears across the parallel combination of the primary winding 28 of the transformer 26 and the horizontal deflection windings 42 of the yoke during the saturation of the transistor 12. The inductance of the primary coil 28 is selected to substantially exceed that of the horizontal deflection windings 42. A linearly increasing current wave, (the portion 50 of the waveform 52) is driven through the horizontal deflection windings 42 during the trace portion of the scanning cycle. At the end of the trace portion of the scanning cycle, the PNP transistor 12 is driven to cut-off by the positive portion of the driving signal 46. When cut-off, the transistor 12 exhibits a very high impedance and acts like an open switch.

The magnetic field of the deflection windings 42 collapses when the transistor 12 cuts-off and a half wave oscillation (portion 54 of curve 52) is produced to effect a quick retrace. The sudden collapse of the magnetic field results in the development across the primary coil 28 of a pulse of voltage which is applied across the transistor 12, as shown by the peaked portion of the waveform 48. The peak amplitude of the voltage pulse 48 is determined primarily by the shunt inductances of the horizontal deflection windings 42 and the primary winding 28, the magnitude of the B+ voltage, and the retrace time of the scanning cycle. The parameters of the circuit are chosen to limit the peak inverse voltage to an amplitude below that of the breakdown voltage of the transistor 12.

The bi-directional conduction characteristics ofthe transistor 12 permits reverse current flow during the beginning of the trace portion of the scanning cycle, when the transistor is again driven to saturation, and therefore, eliminates the need for a damper diode as is now conventional in vacuum tube circuits. The voltage induced in the primary coil 28 during the retrace portion of the scanning cycle is stepped-up in the high voltage secondary coil 32 of the transformer 26, rectified in the diode 36 and applied to supply the operating potential for the ultor electrode of the picture tube 38.

One of the major problems in such a horizontal deflection and high voltage power supply circuit is that of eliminating or preventing parasitic oscillations or "ringing" caused by the stray and leakage reactances of the flyback transformer resonating to produce oscillations when shock excited by the flyback pulses. In FIGURE 2 an approximate equivalent circuit of the circuit of FIGURE 1 including such reactances is illustrated. The circuit includes a battery E which has a voltage rating which corresponds to the equivalent voltage which is applied to the yoke during the trace portion of the horizontal deflection cycle. A switch S, which is the functional representation of the transistor 12, is connected in series between the battery E and an inductor $L_1$. The inductor $L_1$ is the equivalent inductance of the parallel combination of the horizontal deflection windings 42 and the primary winding 28 as referred to the high voltage side of the transformer 26. A capacitor $C_1$ is connected in parallel with the inductor $L_1$ and represents the combination of the capacitor 44 as well as any stray capacitances of the yoke horizontal deflection and primary windings, all referred to the high voltage side of the transformer 26.

The equivalent circuit of FIGURE 2 also includes a capacitor $C_3$ which represents the equivalent stray capacitance as measured from the high voltage terminal 34 of the transformer 26 to ground in FIGURE 1. The capacitance $C_3$ includes both the stray capacitance of the high voltage secondary coil 32 and the anode-cathode capacitance of the high voltage rectifier 36. An inductor $L_2$ is connected between the high voltage sides of the capacitors $C_1$ and $C_3$ and represents the leakage inductance of the high voltage secondary winding 32 to the low voltage primary winding 28. A capacitor $C_2$, which is connected in parallel with the inductor $L_2$, represents the equivalent stray capacitance across the high voltage winding 32.

This equivalent circuit is more fully derived in the previously referenced patent 2,964,674. The condition of no trace ringing imposed in the patent is that the voltage $e_1(t)$ must equal $e_3(t)$ at the end of retrace so that the voltage $v_2$ will equal zero at this time. Thus, to prevent ringing, it is important that the parameters of the equivalent circuit of FIGURE 2 have certain definite relationships with respect to each other. However, it was found that in a transistor circuit as shown in FIGURE 1 with a prior art flyback transformer the value of $C_3$ was too large to prevent trace ringing. This was because the physical size of the high voltage secondary coil 32 became too large due to the large number of turns required to step-up the low voltage permitted to develop in the primary coil 28 of a transformer in a transistor circuit.

Figure 3:
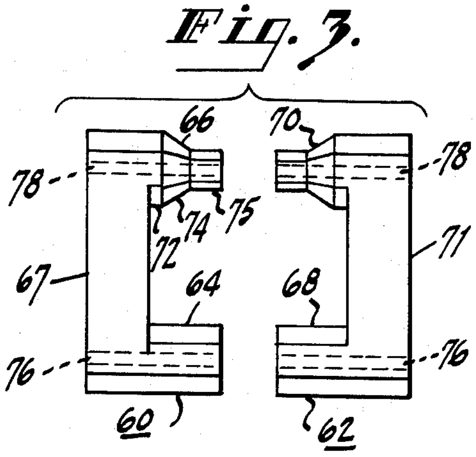
FIGURE 3 is a view of the core sections before assembly of a flyback transformer embodying the invention.

Referring now to FIGURE 3, a magnetic core for a flyback transformer embodying the invention includes a pair of C-shaped core sections 60 and 62. Each of the core sections 60 and 62 are formed of a ferrite material and are molded to be substantially identical. The core section 60 includes a pair of arms 64 and 66 extending laterally from opposite ends of the body 67 of the section 60. Similarly the core section 62 also includes a pair of lateral arms 68 and 70 extending from the body 71 thereof. The lateral arm 66 of the core section 60 is divided into three segments of different cross sectional areas. A first, or initial, segment 72, beginning at the junction of the lateral arm 66 and the body 67 of the core section 60, has a cross sectional area substantially identical to the cross sectional area of the other lateral arm 64, of the section 60. A second, or intermediate segment 74 of the arm 66 has a tapering cross sectional area. A third or final segment 75 of the arm 66 has a uniform cross sectional area which is substantially less than the cross sectional area of the first segment 72 thereof. The lateral arm 70 of the section 62 is similarly formed.

The C-shaped core sections 60 and 62 are assembled so that the arms 64 and 68 and the arms 66 and 70 are aligned to be respectively contiguous with each other. Aperatures 76 and 78 are formed in the lateral arms 66 and 70, and 64 and 68 respectively so that the core sections 60 and 62 may be combined with each other by inserting a bolt through each of the apertures 76 and 78 and fastening a nut thereon (not shown).

Figure 4:
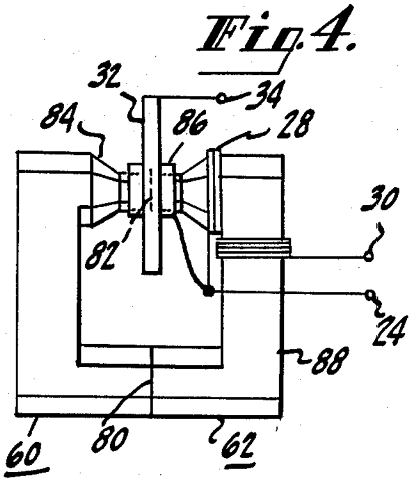
FIGURE 4 is a view of an assembled flyback transformer embodying the invention.

When so combined, as shown in FIGURE 4, a cleavage or parting plane is formed at the junctions of the sections 60 and 62. A pair of air gaps 80 and 82 of a small and predetermined magnitude is formed at the junctions of the C-shaped core sections 60 and 62 and prevents saturation of the core.

As assembled, the ferrite core of a flyback transformer embodying the invention, is substantially rectangular in shape. One leg 84 of the core has a portion having a cross sectional area which is constricted as compared to the other three legs of the core. The other legs of the core all exhibit a prime or nonconstricted cross sectional area. A coil form 86 is placed around the constricted portion of the leg 84 and a high voltage secondary coil 32, including a plurality of turns, is wound in a multiplicity of layers around the coil form 86 so as to have the configuration of an apertured disc. The disc-like configuration of the secondary coil 32 causes it to exhibit a much reduced distributed capacitance to the ferrite core, which is nominally at ground potential, than would be produced by a secondary coil wound in the form of a helix.

The low voltage primary coil 28 is wound on a part of the core which exhibits a prime or non-constricted cross sectional area. In FIGURE 4, a number of turns of the primary coil 28 is shown wound on the initial or non-constructed portion of the leg 84 while the remainder of the turns are wound on the next adjoining leg 88 of the core. The exact positioning of the turns of the primary coil 28 determines the amount of leakage reactance ($L_2$ in FIGURE 2) exhibited by the flyback transformer. If more turns are positioned on the leg 88, the leakage inductance $L_2$ increases while conversely, if more turns are positioned on the leg 84, the leakage inductance $L_2$ decreases. The exact proportioning of the primary coil 28 on the legs 84 and 88 is determined by individual design considerations.

The number of turns in the primary coil 28 and the reluctance of the core are selected to cause the primary coil 28 to exhibit an inductance appreciably greater than the inductance of the horizontal deflection windings 42 (FIGURE 1) so as not to shunt the deflection current. However, the relatively low voltage developed in the primary coil 28 requires a large number of turns in the secondary coil 32 to obtain the desired step-up transformation of the primary voltage. Such a large number of turns in the secondary coil 32 would produce a large area disc if the secondary coil 32 were wound around a prime or non-constricted part of the core. This would cause the stray capacitance $C_3$ to be too large to permit design of the horizontal deflection circuit to prevent ringing, as taught in the heretofore referenced Patent 2,964,674.

However, the constricted portion of the leg 84 permits the high voltage secondary coil 32 to be wound so that the apertured disc-like configuration of the coil 32 has a substantially reduced inner diameter. Thus, for a predetermined number of turns in the coil 32 to effect a desired step-up transformation from the primary voltage, the outer diameter of the disc is also appreciably reduced. Since both the inner and outer diameters of the secondary coil 32 are reduced, the surface area is also reduced, and the capacitance exhibited between the terminal 34 of the transformer and ground is also reduced. It has been found that such a reduction in the stray capacitance reduces the distributed capacitance $C_3$ to a value which prevents ringing from starting in accordance with the principle enunciated in the Patent 2,964,674.

Additionally, the constriction in the core does not increase the reluctance of the core much above what it is in the absence of the constriction. Thus, the inductance exhibited by the primary coil 28 is only slightly reduced and the deflection current is not shunted around the horizontal deflection windings 42 of the yoke. The reason that the flyback transformer exhibits such desirable characteristics is because the air gaps 80 and 82 contribute such an appreciable fraction of the total reluctance of the core that the relatively small constricted area does not affect the total reluctance significantly.

Furthermore, the tapered portions, or segments, of the core leg 84 prevents arc-over between the outermost, and consequently higher voltage, turns of the secondary coil 32 and the leg 84 of the transformer core. Without such tapering, the outermost turns would be so close to the prime or non-constricted segments of the core leg 84 that arc-over might occur if the insulation of the outermost turns of the secondary coil 32 were not increased.

Additionally, it will be appreciated that if the cross sectional area of all of the legs of the transformer core were reduced to that of the constricted portion, in order to reduce the distributed capacitance of the secondary coil, the loss in scanning current in the yoke windings 42 due to such a core would be excessive.

Thus, the flyback transformer is especially suited for a transistor circuit and includes a ferrite core having one leg including a small portion which is constricted in cross sectional area as compared to the rest of the core. This causes a high voltage secondary coil wound thereon to exhibit a reduced capacitance to ground while the inductance of the primary coil, wound on a portion of the core which is not constricted, is reduced only a slight amount. This arrangement permits a transistor horizontal deflection circuit to be designed which delivers the proper deflection current to the horizontal deflection winding of the yoke and the proper operating potential to the ultor electrode of the picture tube without the introduction of parasitic oscillations or "ringing" into the circuit.

What is claimed is:

1. A flyback transformer comprising in combination:
a bi-part ferrite core including a pair of substantially identical C-shaped core sections juxtaposed to form a composite core of an apertured rectangular shape;
all of the legs but one of said rectangular shaped core having a substantially uniform cross sectional area defined by similar prime dimensions, with said one leg having end portions with a cross sectional area corresponding to said uniform cross sectional area and defined by said prime dimensions, and an additional portion intermediate said end portions with a constricted cross sectional area defined by dimensions appreciably less than said prime dimensions;
a high voltage step-up secondary coil having a plurality of turns wound in a configuration of a disc around the constricted portion of said one leg; and
a low voltage primary coil wound around another leg of said core; the relationship of said lesser dimensions of said constricted area to said prime dimensions, and the relationship of the extent of said constricted leg portion with respect to the extent of the leg portions of said uniform cross sectional area defined by said prime dimensions, being selected in such manner as to ensure appreciable reduction of the distributed stray capacitance between said secondary coil and said core relative to the distributed stray capacitance between the secondary coil and core that would obtain were the secondary coil to be wound with the same plurality of turns around a core leg portion having said uniform cross sectional area defined by said prime dimensions, said stray capacitance reduction being accompanied by relatively little change in the inductance exhibited by said primary coil relative to the inductance that would be exhibited by said primary coil were all portions of all legs of said core to have said uniform cross sectional area defined by said prime dimensions.

2. A flyback transformer comprising in combination:
a bi-part ferrite core including a pair of substantially identical C-shaped core sections;
each of said core sections having a pair of lateral arms positioned at opposite ends thereof;
a first one of each said pairs of lateral arms including,
  a first segment having a uniform initial cross sectional area,
  a second intermediate segment having a tapering cross sectional area, and
  a third segment having a final uniform cross sectional area substantially less than the initial cross sectional area of said first segment, means for juxtaposing said core sections with said first lateral arms aligned contiguous with each other to form a composite core having one leg with a constricted portion;

a coil form mounted to envelope the constricted portion of said core formed by the third segments of said first lateral arms;

a high voltage secondary coil having a plurality of turns wound in a multilayered disc configuration around said coil form; and a low voltage primary coil wound partially around said first segment of one of said lateral arms in said one leg having a constricted portion and partially around the next adjacent leg of said composite core.

3. A transistorized horizontal deflection circuit of a television receiver including horizontal deflection windings and a flyback transformer, said circuit normally subject to undesirable oscillations during the trace portion of the deflection cycle of said circuit due to leakage reactances exhibited by said transformer, comprising the combination of:

a bi-part ferrite core including a pair of substantially identical C-shaped core sections juxtaposed with intervening air gaps to form a composite core of an apertured rectangular shape;

said core formed with one leg thereof having a portion, extending on either side of the air gap formed in said one leg at the junction of said core sections, which is constricted with respect to the remaining portion of said one leg;

a high voltage secondary coil having a plurality of turns wound in the configuration of a disc around the constricted portion of said one leg to exhibit a desired reduced stray capacitance between said secondary coil and said core;

a low voltage primary coil wound partially around the remaining portion of said one leg and partially around an adjacent leg of said core to cause said transformer to exhibit a desired leakage inductance;

an output transistor coupled across said low voltage primary coil and alternately switched from a cut-off condition to a saturated conduction condition at the repetition rate of said deflection cycle; and means couping said primary coil across said horizontal deflection windings;

the inductance of said horizontal deflection windings, the leakage inductance of said flyback transformer and the stray capacitance of said high voltage secondary coil being selected to eliminate undesirable oscillations during the trace portion of the deflection cycle.

References Cited in the file of this patent

UNITED STATES PATENTS

| | | |
|---|---|---|
| 1,880,412 | Burton | Oct. 4, 1932 |
| 2,612,545 | Gray | Sept. 30, 1952 |

FOREIGN PATENTS

| | | |
|---|---|---|
| 151,160 | Austria | Oct. 25, 1937 |